US009595239B2

(12) United States Patent
Drolet et al.

(10) Patent No.: US 9,595,239 B2
(45) Date of Patent: Mar. 14, 2017

(54) COLOR DISPLAY CALIBRATION SYSTEM

(71) Applicant: Apple Inc., Cupertino, CA (US)

(72) Inventors: Jean-Jacques Drolet, Cupertino, CA (US); Paul S. Drzaic, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 14/614,754

(22) Filed: Feb. 5, 2015

(65) Prior Publication Data
US 2016/0232875 A1   Aug. 11, 2016

(51) Int. Cl.
*G09G 5/02* (2006.01)
*G09G 3/20* (2006.01)
*G02F 1/137* (2006.01)
*G02F 1/29* (2006.01)
*G09G 3/00* (2006.01)

(52) U.S. Cl.
CPC ............. *G09G 5/026* (2013.01); *G02F 1/137* (2013.01); *G02F 1/29* (2013.01); *G09G 3/006* (2013.01); *G09G 3/2003* (2013.01); *G09G 2320/0693* (2013.01); *G09G 2340/06* (2013.01); *G09G 2360/145* (2013.01)

(58) Field of Classification Search
CPC combination set(s) only.
See application file for complete search history.

(56) References Cited

U.S. PATENT DOCUMENTS

| 7,554,692 | B2 * | 6/2009 | Ajito | .................. G01J 3/50 348/383 |
| 8,471,841 | B2 | 6/2013 | Evanicky et al. | |
| 8,638,340 | B2 | 1/2014 | Holub | |
| 2006/0007249 | A1 | 1/2006 | Reddy et al. | |
| 2006/0038929 | A1 * | 2/2006 | Wang | .................. G01J 3/26 349/18 |
| 2014/0362052 | A1 | 12/2014 | McCaughan et al. | |

FOREIGN PATENT DOCUMENTS

EP          1641286          3/2006

OTHER PUBLICATIONS

GratingWorks Co. Ltd. 2004 [retrieved on Apr. 16, 2015]. Retrieved from the Internet: <URL: www.gratingworks.com/products/flat_field_concave_grating.htm>.

* cited by examiner

*Primary Examiner* — Van Chow
(74) *Attorney, Agent, or Firm* — Treyz Law Group, P.C.; G. Victor Treyz; Joseph F. Guihan (57) ABSTRACT

A display calibration system may be used to calibrate a display. The display calibration system may have an image sensor that captures images of the display. An electrically controllable tunable filter such as an electrically tunable liquid crystal birefringence cell filter may be used to produce various wavelength-dependent filter characteristics in accordance with a variety of different filter settings. Control circuitry in the display calibration system may be used to adjust the filter to implement one or more color matching functions or to produce other desired filter characteristics for the display calibration system. The image sensor may measure light emitted from the display while the control circuitry is adjusting the filter. The control circuitry may then process the measured light to produce calibration data for the display. The calibration data may be loaded into the display by the control circuitry to calibrate the display.

18 Claims, 7 Drawing Sheets

COLOR DISPLAY CALIBRATION SYSTEM

BACKGROUND

This relates generally to displays, and, more particularly, to calibrating color displays.

Electronic devices often include displays. Color displays include pixels of different colors. For example, a display may include an array of pixels based on red, green, and blue light-emitting diodes. Due to manufacturing variations, light-emitting diodes may exhibit variations in output light intensity and wavelength. Unless care is taken, these variations may cause a display to exhibit undesired color shifts and other visible artifacts.

Display calibration equipment has been developed to help ensure that displays perform satisfactorily. During manufacturing, the performance of a display may be measured using the calibration equipment. Calibration settings may then be stored in the display to compensate for any detected variations in display performance.

Some calibration equipment is based on spectroradiometers. Spectroradiometers can be used to make accurate color measurements, but can be slow and costly when spatial information on display performance is desired. Filter-based colorimeters are less expensive and work well when making color measurements on broadband light sources such as incandescent light. Filter-based colorimeters may not, however, offer desired levels of accuracy when evaluating narrowband light sources such as certain light-emitting diodes.

It would therefore be desirable to be able to provide improved display calibration equipment.

SUMMARY

A display calibration system may be used to calibrate a display. The display may have an array of pixels such as an array of pixels having respective light-emitting diodes. Calibration operations may involve evaluating the output of the pixels using the display calibration system while the display is using the pixels to generate light.

The display calibration system may have an image sensor that captures images of the display. An electrically controllable filter may be used to produce various wavelength-dependent filter characteristics in accordance with a variety of different filter settings.

Control circuitry in the display calibration system may be used to adjust the adjustable filter to implement one or more color matching functions or other desired filter characteristics for the display calibration system. The image sensor may measure light emitted from the display during calibration operations while the control circuitry is adjusting the filter.

The control circuitry may then process the measured light to produce display calibration data. The calibration data may be loaded into the display by the control circuitry to calibrate the display.

DETAILED DESCRIPTION

Figure 1:
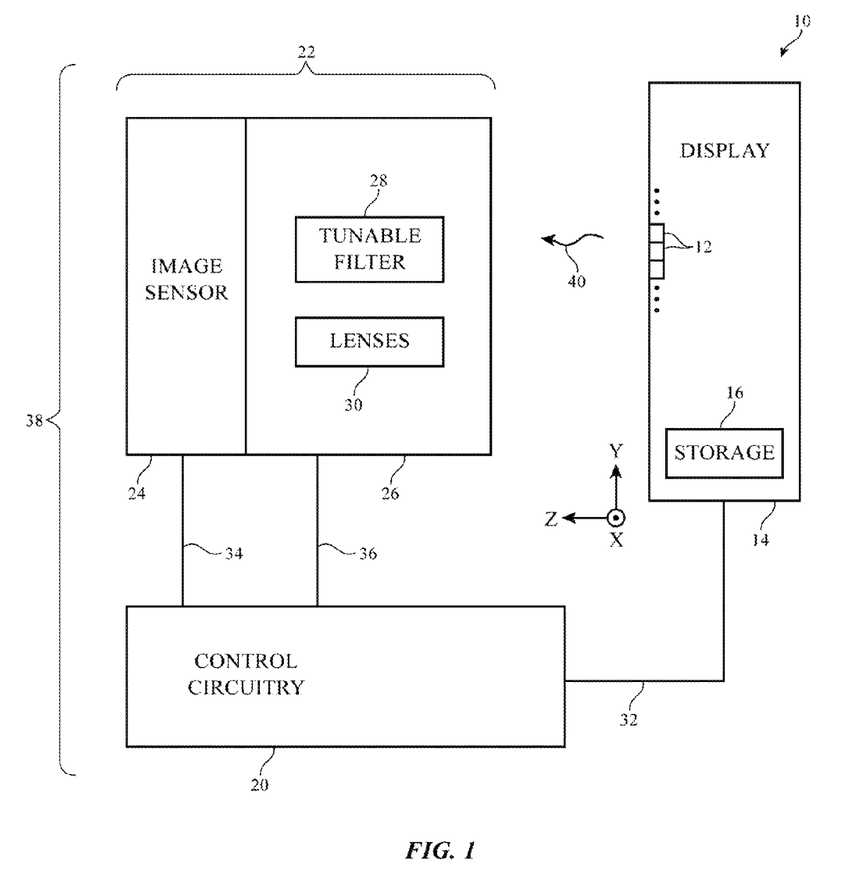
FIG. 1 is a diagram of an illustrative display calibration system in accordance with an embodiment.

FIG. 1 is a diagram showing how a display in an electronic device may be calibrated using a display calibration system. Electronic device 10 includes display 14. Device 10 may be a laptop computer, a stand-alone display, an embedded system such as a kiosk or vehicle with a display, a television, a computer with an integrated display, a tablet computer, a cellular telephone, a wrist-watch device, other miniature handheld or wearable equipment, or other electronic equipment that includes a display.

Display 14 includes an array of pixels 12 and control circuitry such as storage 16. There may be any suitable numbers of rows and columns of pixels 12 in display 14 (e.g., tens, hundreds, thousands, tens of thousands, or more). Pixels 12 may be based on organic light-emitting diodes, crystalline semiconductor diodes (e.g., micro-light-emitting diodes), liquid crystal display structures, electrophoretic display structures, plasma display structures, electrowetting display structures, or other display technologies.

Pixels 12 may include pixels of different colors. For example, pixels 12 may include red, green, and blue pixels or other sets of colors. Display 14 may have pixels of three different colors, pixels of four different colors, etc.

Due to manufacturing variations, pixels 12 in the array of pixels in display 14 will not all perform identically when initially assembled into display 14. Variations in the performance of pixels 12 may cause different portions of display 14 to produce outputs levels of varying intensity and color (i.e., display 14 may exhibit spatially varying color shifts and intensity fluctuations).

During calibration operations, display calibration system 38 may acquire color and intensity data on the output of display 14. In particular, display calibration system 38 may use image sensor and filter circuitry 22 to make measurements on light 40 that is emitted from display 14 while display 14 is emitting test patterns of light 40. This allows display calibration system 38 to evaluate the performance of pixels 12 in display 14 as a function of position in lateral dimensions X and Y. The resolution of system 38 may be sufficient to capture performance data for each individual pixel 12 in display 12 or a lower resolution may be used to enhance calibration throughput. Illustrative configurations for display calibration system 38 in which system 38 gathers data for each pixel 12 in display 14 by analyzing images of display 14 are sometimes described herein as an example.

As shown in FIG. 1, image sensor and filter circuitry 22 may include photosensitive components such as two-dimensional image sensor 24. Image sensor 24 may be, for example, a charge-coupled device (CCD) image sensor or other solid state image sensor. The resolution of sensor 24 may, if desired, be sufficiently large to capture data from the array of pixels 12 in display 14.

During display calibration operations, control circuitry 20 may direct display 14 to display test patterns on pixels 12 by sending test patterns and/or control signals to display 14 over path 32. Light 40 that is emitted by display 14 may be detected and measured by image sensor 24 after passing through filter structures 26. Measured light data from sensor 24 (i.e., color and intensity data on the light emitted by the pixels of display 14) may be provided to control circuitry 20 by path 34.

Filter structures 26 may include an electrically tunable filter such as tunable filter 28 and one or more lenses 30. Tunable filter 28 may be located between a lens and image sensor 24, may be located between a pair of front and rear lenses, or tunable filter 28 may be located between a rear lens and display 14 (i.e., a lens 30 may be located between image sensor 24 and tunable filter 28). Lenses 30 may be single-element or multi-element lenses and may be used to focus an image of the array of pixels 12 on the front face of display 14 onto image sensor 24 so that the performance of each pixel can be evaluated from the image data produced by image sensor 24.

Control circuitry 20 can adjust tunable filter 28 by supplying control signals to tunable filter 28 over path 36. During display calibration operations, filter 28 may be adjusted to exhibit different wavelength-dependent filter responses. A desired filter characteristic (i.e., a desired wavelength-dependent transmission curve) can be implemented by processing multiple measurements from image sensor 24 each of which is taken using a different filter configuration for filter (i.e., by using the principal of superposition).

Figure 2:
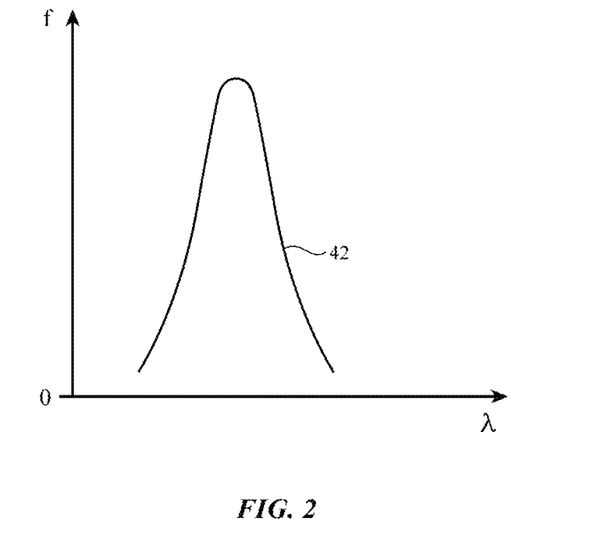
FIG. 2 is a diagram of an illustrative color matching function that may be used in analyzing display output with the display calibration system in accordance with an embodiment.

Consider, as an example, the illustrative wavelength-dependent filter function f that is represented by curve 42 in the graph of FIG. 2. During calibration operations, it may be desirable to use circuitry 22 to implement one or more filter functions such as function f using circuitry 22. This allows light 40 to be filtered before being measured by image sensor 24. Functions such as function f may have any suitable transmission versus wavelength characteristic. With one illustrative configuration, tunable filter 28 may be used to implement trichromatic color matching functions (i.e., functions such as function f may be color matching functions that replicate the eye response of a standard observer). The color matching functions implemented by filter 28 may be, for example, color matching functions established by the International Commission on Illumination (CIE) such as the color matching functions associated with the CIE 1931 XYZ color space or other suitable color matching functions. In general, filter functions such as function f may have any suitable shape. The use of filter 28 to implement a wavelength-dependent filter characteristic such as a color matching function is merely illustrative.

Figure 3:
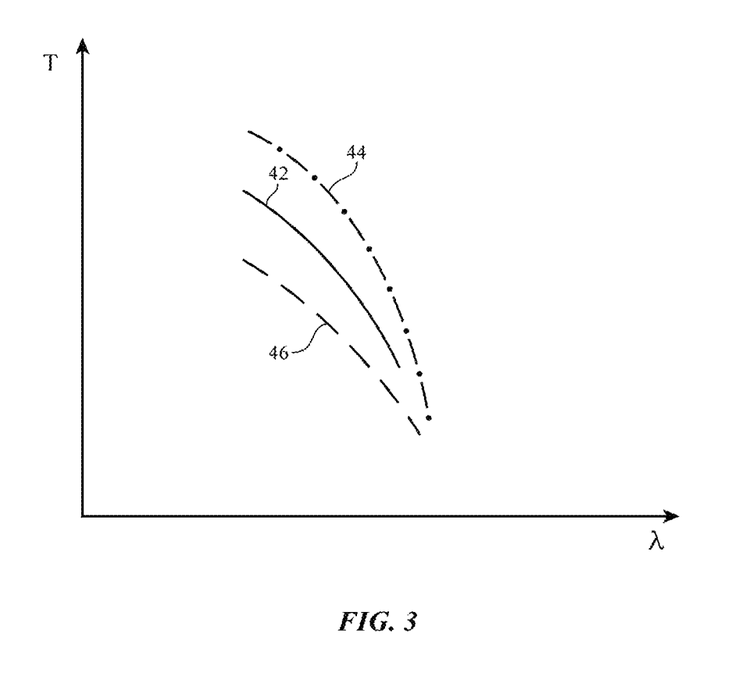
FIG. 3 is a diagram showing how a desired light transmission function can be implemented by using an adjustable filter at multiple settings in accordance with an embodiment.

FIG. 3 is a graph illustrating how a desired filter function can be implemented by taking measurements using different settings for filter 28. In the example of FIG. 3, curve 42 corresponds to a desired filter function (light transmission T versus wavelength λ). During a first measurement with image sensor 24, control circuitry 20 adjusts filter 28 to produce the filter characteristic represented by line 44. During a second measurement with image sensor 24, control circuitry 20 adjusts filter 28 to produce the filter characteristic represented by line 46. Desired filter function 42 is the result of the superposition of lines 44 and 46. In the example of FIG. 3, the superposition of two filter settings is used in producing a desired filter function. This is merely illustrative. Any suitable number of different filter settings may be used by filter 28 when acquiring data on the output of display 14 with image sensor 24 to implement a desired filter function (e.g., one or more filter settings, two or more, three or more five or more, ten or more, etc.). Desired filter function attributes such as desired slope and curvature attributes for the filter function may be realized by using a sufficient number of filter settings.

Filter 28 may be an electrically controllable filter that is based on an electrically controllable birefringence cell. Filter 28 may, as an example, be a filter that exploits the linear electro-optic effect (e.g., a filter based on a material such as lithium niobate that exhibits a linear changes in index of refraction as a function of applied electric field). With another suitable arrangement, which is sometimes described herein as an example, filter 28 may be based on a liquid crystal cell that changes index of refraction as a function of applied electric field (i.e., filter 28 may be an electrically tunable liquid crystal birefringence cell filter). Other types of filter technology may be used in implementing electrically tunable filter 28, if desired.

Figure 4:
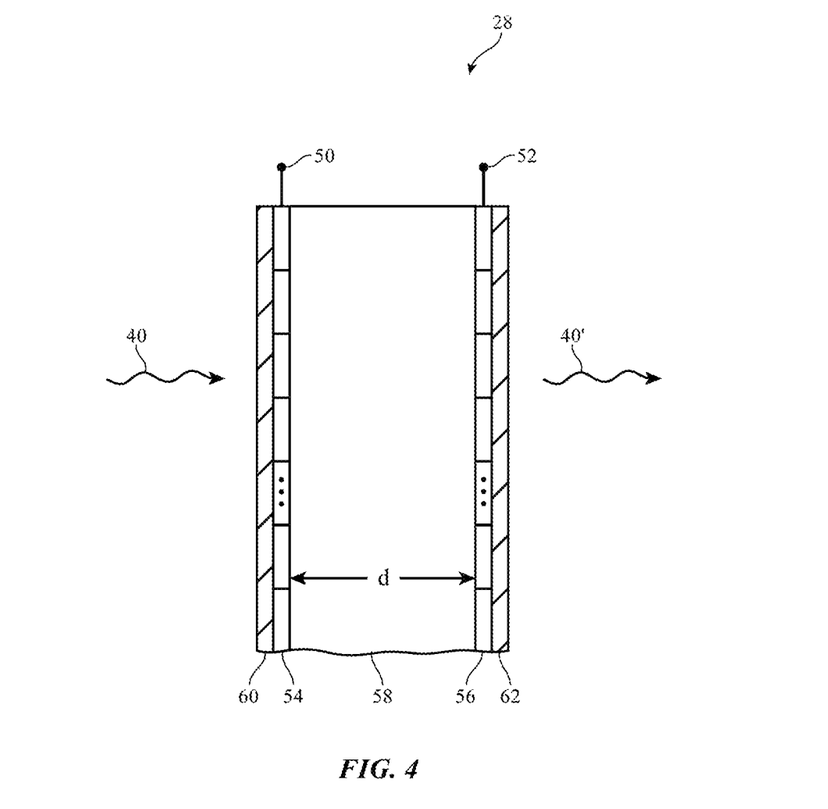
FIG. 4 is a cross-sectional view of an illustrative filter based on an electrically controllable birefringence cell in accordance with an embodiment.

A cross-sectional side view of filter 28 in an illustrative configuration in which filter 28 has been based on a liquid crystal cell is shown in FIG. 4. As shown in FIG. 4, filter 28 may have input polarizer 60 to polarize incoming light 40 from display 14. Filter 28 may also have analyzer polarizer 62. Polarizers 60 and 62 may be linear polarizers with parallel transmission axes. Light 40 from display 14 is linearly polarized upon passing through input polarizer 60. Liquid crystal cell 58 has an adjustable index of refraction. Light 40 that has been linearly polarized by polarizer 60 passes through cell 58 to analyzer polarizer 62. Analyzer polarizer 62 allows output light 40' that is linearly polarized in alignment with the polarization axis of polarizer 62 to exit cell 58.

Liquid crystal cell 58 may be interposed between polarizers 60 and 62. Liquid crystal cell 58 may have transparent electrodes 54 and 56, which are connected to respective terminals 50 and 52. During operation, control circuitry 20 may apply controlled voltages across terminals 50 and 52, so that electrodes 54 and 56 produce an electric field across liquid crystal cell 58 that has a desired strength. If desired, electrodes 54 and 56 may be segmented (e.g., electrodes 54 and 56 may each include a 32×32 array of individually controllable electrodes or other suitable number of electrodes). The use of an array of individually controllable electrodes may allow control circuitry 20 to adjust cell 58 by different amounts across the surface of cell 58 (e.g., to even out spatial variations in cell performance, etc.). This allows system 38 to compensate for spatial variations that might otherwise affect calibration measurement accuracy. Cell 58 may be calibrated by making measurements using filter 28 while providing reference light 40 using one or more reference light sources in place of display 14. The reference light sources may be monochromatic sources or other known sources and may be used to calibrate system 38 before system 38 is used to test display 14. Reference light sources may, if desired, be mounted in the plane of display 14.

Liquid crystal cell 58 may exhibit an adjustable birefringence. The ordinary and extraordinary axes of liquid crystal 58 may be perpendicular to each other and may be oriented at 45° angles with respect to the transmission axis of polarizers 60 and 62. In this configuration, the transmission T of filter 28 may be given by equation 1, where d is the thickness of cell 58, Δn is the difference between the extraordinary axis index of refraction $n_e$ and the ordinary axis index of refraction $n_o$ for liquid crystal 58, and λ is the wavelength of light 40.

$$T=\cos^2[\pi d\,\Delta n/\lambda] \tag{1}$$

The value of Δn (i.e., the amount of birefringence of liquid crystal 58) is a function of applied electric field (i.e., voltage V across terminals 50 and 52). When the voltage V has a first value, the transmission T of filter 28 may have a first characteristic such as the transmission characteristic shown by line 70 of FIG. 5. When V has a second value that is different than the first value, the transmission T of filter 28 may have a second characteristic such as the transmission characteristic shown by line 72 of FIG. 5. Characteristics 72 and 70 may correspond to lines 44 and 46 of FIG. 3 (as an example). By taking multiple measurements of the light output from display 14 each corresponding to a different respective setting for filter 28, a desired transmission function may be implemented (e.g., a color matching function or other suitable filter function).

Figure 5:
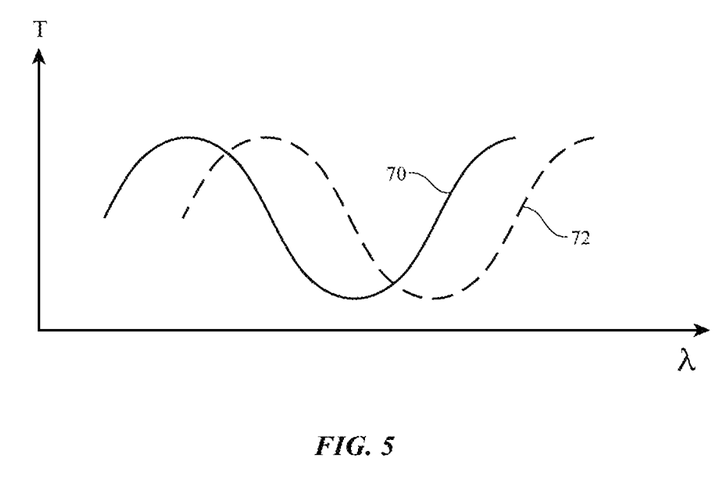
FIG. 5 is a diagram showing illustrative transmittances that may be implemented by adjusting an adjustable filter in accordance with an embodiment.

FIG. 5 is a flow chart of illustrative steps involved in using display calibration system 38 to calibrate display 14.

Figure 6:
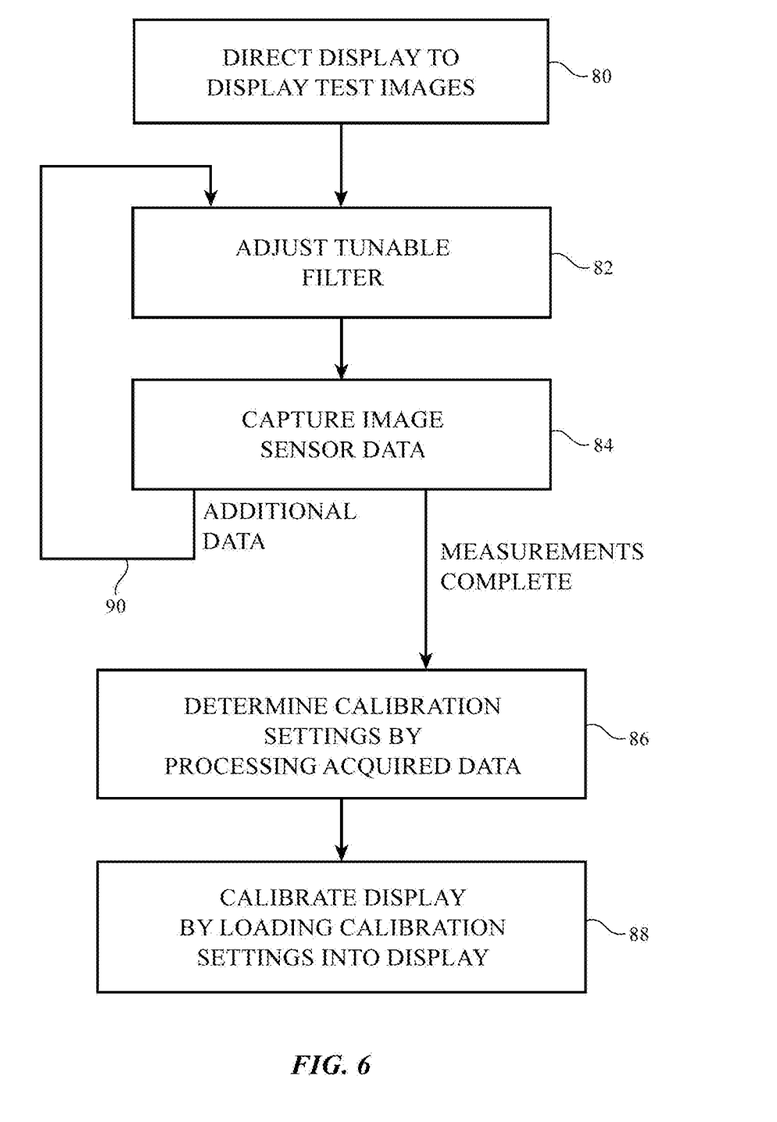
FIG. 6 is a flow chart of illustrative steps involved in calibrating a display using a display calibration system in accordance with an embodiment.

At step 80, control circuitry 20 of system 38 may direct display 14 to display a desired test pattern (test image) on pixels 12. Light 40 from the test pattern on display 14 passes to circuitry 22 of test system 38, as shown in FIG. 1.

At step 82, control circuitry 20 may adjust tunable filter 28 using a filter setting that results in a desired transmission characteristic T for filter 28, as described in connection with FIGS. 3, 4, and 5.

Image sensor 24 may then be used to capture a two-dimensional image of light 40 from pixels 12 of display 14 (step 84).

As illustrated by line 90, additional data may be captured using one or more additional settings for tunable filter 28 (e.g., so that a color matching function or other desired filter function can be implemented through the principal of superposition).

After data has been gathered from image sensor 24 for a desired number of different filter settings for filter 28, control circuitry 20 may produce calibration data for display 14 (step 86). The calibration data may include pixel-by-pixel calibration adjustments to the output of each pixel 12 so that color and intensity can be corrected across all pixels 12 in display 14 (i.e., the calibration data may include spatial color calibration data). Global display calibration data (i.e., color and intensity adjustments that apply to some or all of pixels 12 equally) may also be produced, if desired. The measurement and calibration process may be performed at a single luminance level for the pixels, or at multiple luminance levels for the pixels. Measurement and calibration at different luminance levels can provide improved color fidelity when the gamma response curves of the subpixel color channels are subject to variability. Moreover, this technique can be used to perform measurement and calibration for colors that require the operation of two or three subpixels, for cases where the display output is subject to crosstalk between subpixels. The measurement and calibration process may also be performed for different target color spaces. For example, under some circumstances it may be desirable for the display to render in the sRGB color space, but for other circumstances it may be desirable for the display to render in color spaces such as Adobe RGB, DCI-P3, or Rec 2020. For example, the display may draw on these different calibration settings when switched between one color space mode and another by a display color management system. Calibration data may be produced by processing acquired data from image sensor 24 that corresponds to one or more different test patterns being displayed on display 14, one or more different filter settings for filter 28, one or more different resulting color matching functions or other transmission functions implemented using filter 28, and/or other settings for system 38.

After processing the acquired data from sensor 24 to produce display calibration data for display 14, control circuitry 20 of system 38 may load the display calibration data into storage 16 of display 14 (step 88). When display 14 is operated, display 14 can apply the calibration data that has been loaded into storage 16 (e.g., color offsets and other corrections may be applied), so that the images displayed by pixels 12 are accurate.

Figure 7:
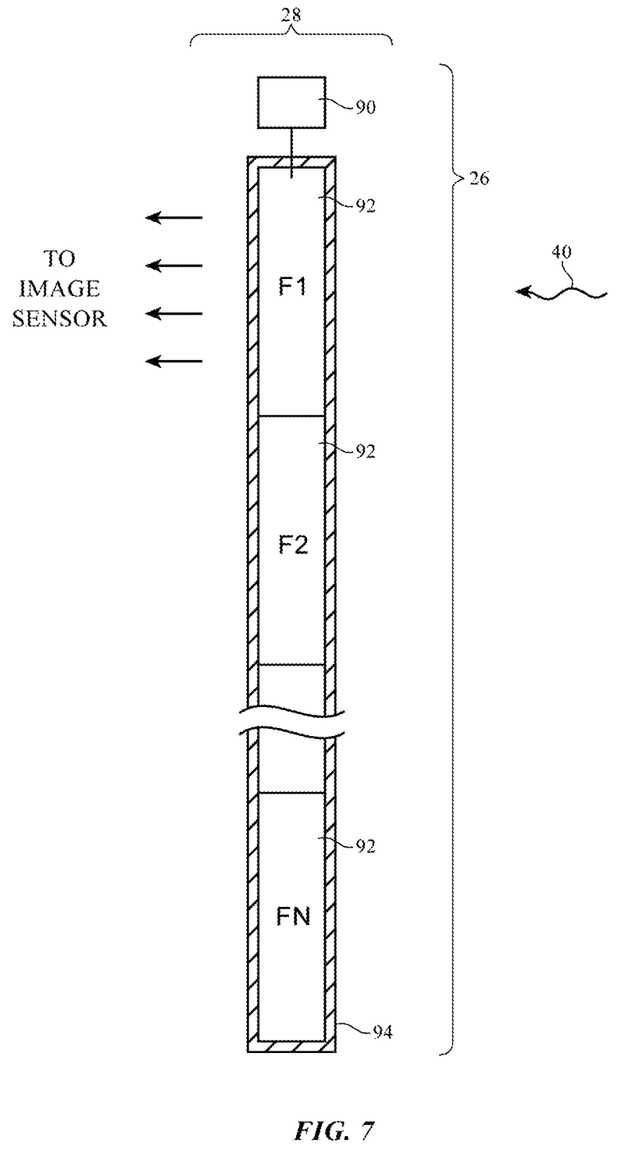
FIG. 7 is a diagram of an illustrative adjustable filter based on a set of swappable static filters in accordance with an embodiment.

If desired, filter 28 can be implemented using a set of swappable static spectral filters (e.g., filters implemented using dyes, gratings, dielectric stacks, and/or other illustrative filter structures). As shown in FIG. 7, for example, static filters 92 may be mounted in a static filter support structure such as structure 94. Structure 94 may be a rotatable filter wheel structure, a linear translating filter holder, or other structure that receives and supports multiple filters 92. Each filter 92 may be a static spectral filter that is configured to make measurements on a particular narrow-band light source color for one of the pixel colors of pixels 12 and/or filters 92, may be a filter corresponding to a color matching function, may be a filter that covers all or part of a spectral range of interest (e.g., in a configuration in which multiple filter measurements are made and processed using control circuitry 20), or may be a filter that covers another particular spectral range of interest. Alternatively, blazed or holographic gratings with a linear array detector may be used in system 38 to enable the simultaneous measurement of a large spectral range in a single measurement.

Actuator 90 (e.g., a motor for rotating a filter wheel, a linear actuator for translating a linear set of filters 92, etc.) may be used to switch each desired filter 92 into use. Actuator 90 may be controlled by control circuitry 20 so that suitable filters 92 may be selected while image sensor 24 collects corresponding measurements on light 40 from display 14. Control circuitry 20 may, for example, switch each of filters F1 . . . FN into use in series until all filters 92 have been used or may switch a selected subsets of filters 92 into use one after the other. There may be three or more filters 92, four or more filters 92, 5-10 filters 92, fewer than 100 filters 92, or any other suitable number of static spectral filters 92 that are used to make measurements for filter 28.

To ensure that the measurements made with filters 92 are sufficiently accurate to allow system 38 to make color calibration measurements on display 14, each filter 92 may have a calibrated response in at least a narrow bandwidth around the narrow linewidths of the light sources of display 14. Each filter 92 may, for example, have at least a full-width half-maximum bandwidth of about 20-30 nm, 40-50 nm, less than 60 nm, less than 75 nm, less than 200 nm, more than 50 nm, or other suitable value. Filters that exhibit transmission over larger ranges of wavelengths may also be used. For example, filters 92 may transmit light across most or all of the visible light spectrum (which extends from about 380 nm to 750 nm). For accurate color calibration measurements, the responses of the filters are known at least in the vicinities of the light source spectra being measured.

System 38 may be calibrated prior to use in making display calibration measurements. For example, a reference light source (or sources) may be used to generate reference light 40 in place of display 14. During reference light source measurements, image sensor 24 may make measurements using various different filter settings for filter 28 (e.g., different filters 92 may be swapped into use). After a sufficient number of measurements have been made to characterize the performance of image sensor and filter circuitry 22 (i.e., after system 38 has been calibrated against the reference light source(s) using all filters 92), system 38 may be used to make calibrating measurements on displays such as display 14.

The foregoing is merely illustrative and various modifications can be made by those skilled in the art without departing from the scope and spirit of the described embodiments. The foregoing embodiments may be implemented individually or in any combination.

What is claimed is:

1. A display calibration system for calibrating a display, comprising:
    control circuitry;
    an electrically tunable filter with a transmission characteristic that is controlled by the control circuitry, wherein the electrically tunable filter comprises first and second polarizers, a liquid crystal cell that is interposed between the first and second polarizers, and electrodes with which the control circuitry adjusts the liquid crystal cell in accordance with a plurality of filter settings; and
    an image sensor that receives light from the display through the electrically tunable filter, wherein the control circuitry captures images of the display corresponding to each of the filter settings to produce calibration data to calibrate the display.

2. The display calibration system defined in claim 1 further comprising at least one lens interposed between the display and the image sensor.

3. The display calibration system defined in claim 2 wherein the control circuitry is configured to process the images of the display to produce the display calibration data.

4. The display calibration system defined in claim 3 wherein the control circuitry is configured to load the display calibration data into the display to calibrate the display.

5. The display calibration system defined in claim 1 wherein the control circuitry is configured to adjust the electrically tunable filter to implement at least one color matching function.

6. The display calibration system defined in claim 5 wherein the control circuitry processes the captured images to produce the display calibration data and stores the display calibration data in the display to calibrate the display.

7. The display calibration system defined in claim 1 wherein the transmission characteristic varies as a function of wavelength.

8. The display calibration system defined in claim 1 wherein each electrode comprises an array of individually controllable electrodes.

9. A display calibration system for calibrating a display, comprising:
    control circuitry;
    an electrically tunable filter with a transmission characteristic that is controlled by the control circuitry, wherein the electrically tunable filter comprises a liquid crystal cell with an electrically controllable birefringence and transparent electrodes to which the control circuitry applies adjustable voltages to adjust the electrically tunable filter; and
    an image sensor that receives light from the display through the electrically tunable filter, wherein the control circuitry adjusts the electrically tunable filter in accordance with a plurality of filter settings and captures images of the display corresponding to each of the filter settings to produce calibration data to calibrate the display.

10. The display calibration system defined in claim 9 wherein the electrically tunable filter comprises an input polarizer and an analyzer polarizer and wherein the liquid crystal cell is interposed between the input polarizer and the analyzer polarizer.

11. The display calibration system defined in claim 9 further comprising at least one lens interposed between the display and the image sensor.

12. The display calibration system defined in claim 11 wherein the control circuitry is configured to process the images of the display to produce the display calibration data and is configured to load the display calibration data into the display to calibrate the display.

13. The display calibration system defined in claim 9 wherein the liquid crystal cell is interposed between the transparent electrodes. the transmission characteristic in accordance with a plurality of filter settings, wherein the image sensor receives the light from the display while the electrically tunable filter is adjusted in accordance with each of the filter settings.

14. A method of calibrating a display that emits light, comprising:
    with an image sensor, receiving light from the display through an electrically tunable filter having first and second polarizers and transparent electrodes and having a transmission characteristic that varies as a function of wavelength; and
    applying adjustable voltages to the electrodes to adjust the electrically tunable filter to change the transmission characteristic in accordance with a plurality of filter settings, wherein the image sensor receives the light from the display while the electrically tunable filter is adjusted in accordance with each of the filter settings.

15. The method defined in claim 14 wherein the electrically tunable filter comprises an electrically controllable birefringence cell and wherein applying adjustable voltages to the electrodes electrically adjusts the electrically controllable birefringence cell.

16. The method defined in claim 15 wherein the electrically controllable birefringence cell comprises a liquid crystal cell and wherein applying adjustable voltages to the electrodes electrically adjusts the liquid crystal cell.

17. The method defined in claim 16 wherein the liquid crystal cell is interposed between the first and second polarizers.

18. The method defined in claim 17 wherein at least one setting of the plurality of filter settings is a color matching setting.

* * * * *

UNITED STATES PATENT AND TRADEMARK OFFICE
CERTIFICATE OF CORRECTION

| | | |
|---|---|---|
| PATENT NO. | : 9,595,239 B2 | Page 1 of 1 |
| APPLICATION NO. | : 14/614754 | |
| DATED | : March 14, 2017 | |
| INVENTOR(S) | : Jean-Jacques Drolet et al. | |

It is certified that error appears in the above-identified patent and that said Letters Patent is hereby corrected as shown below:

In the Claims

In Claim 13, Column 8, Line 27, delete "the transmittion characteristic in accordance with a plurality of filter settings, wherein the image sensor receives the light from the display while the eletrically tunable filter is adjusted in accordance with each of the filter settings."

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*